US00RE39954E

(19) United States
(12) Reissued Patent
Asano et al.

(10) Patent Number: US RE39,954 E
(45) Date of Reissued Patent: Dec. 25, 2007

(54) AUTOMOBILE ON-BOARD AND/OR PORTABLE TELEPHONE SYSTEM

(75) Inventors: Nobuo Asano, Machida (JP); Osama Kato, Yokosuka (JP)

(73) Assignee: Matsushita Electric Industrial Co., Ltd., Osaka (JP)

(21) Appl. No.: 09/887,042

(22) Filed: Jun. 25, 2001

Related U.S. Patent Documents

Reissue of:
(64) Patent No.: 5,677,929
Issued: Oct. 14, 1997
Appl. No.: 08/272,156
Filed: Jul. 8, 1994

U.S. Applications:
(63) Continuation of application No. 09/337,403, filed on Jun. 21, 1999, now Pat. No. Re. 37,420.

(30) Foreign Application Priority Data

Jul. 16, 1993 (JP) ..... 05-199013

(51) Int. Cl.
*H04B 1/707* (2006.01)

(52) U.S. Cl. ..... 375/141; 375/144; 375/146; 375/148; 375/150

(58) Field of Classification Search ..... 375/141, 375/144, 146, 148, 150; 370/320, 335, 342, 370/441, 210
See application file for complete search history.

(56) References Cited

U.S. PATENT DOCUMENTS 4,901,307 A 2/1990 Gilhousen et al.
5,325,394 A * 6/1994 Bruckert ..... 375/148
5,471,497 A 11/1995 Zehavi
5,488,629 A * 1/1996 Takahashi et al. ..... 375/150
5,548,583 A * 8/1996 Bustamante ..... 340/825.49
5,751,761 A 5/1998 Gilhousen
5,943,361 A 8/1999 Gilhousen et al.

OTHER PUBLICATIONS

Allen Salmasi et al., "On The System Design Aspects of Code Divison Multiple Access (CDMA) Applied To Digital Cellular And Personal Communications Networks," May 1991, 41st IEEE Vehicular Technology Conference, pp. 57–62.

* cited by examiner

*Primary Examiner*—Don N. Vo
(74) *Attorney, Agent, or Firm*—Venable LLP; Catherine M. Voorhees

(57) ABSTRACT

In an automobile on-board and/or portable telephone system capable of increasing the capacity of subscribers easily on the basis of changing of the information transmission bit rate, spread codes obtained by multiplying orthogonal spread codes (m in number) by a pseudo-random noise series are assigned to individual channels in the same cell in such a manner that the orthogonal spread codes are multiplied by some types of pseudo-random noise series having different phases, thereby making it possible to maintain the number of channels in the same cell at a value which is a multiple of the number of the orthogonal spread codes. Through this, in the case where the transmission bit rate is halved as compared to the presently existing rate in the future, assignment of spread codes which are increased in number to as large a value as necessary can be achieved and the subscriber's capacity can be increased within a range in which the necessary quality can be maintained even when link paths for m or more channels are set up in one cell from the viewpoint of Signal to Interference Ratio.

4 Claims, 5 Drawing Sheets

| CHANNEL NUMBER | ORTHOGONAL SPREAD CODE | ⊗ | PN SERIES → SPREAD CODE | |
|---|---|---|---|---|
| # 1 | W1(t) | ⊗ | PN(t) | FIRST GROUP |
| # 2 | W2(t) | ⊗ | PN(t) | |
| ⋮ | | ⋮ | | |
| # m | Wm(t) | ⊗ | PN(t) | |
| #(m+1) | W1(t) | ⊗ | PN(t−φ) | SECOND GROUP |
| #(m+2) | W2(t) | ⊗ | PN(t−φ) | |
| ⋮ | | ⋮ | | |
| #(2m) | Wm(t) | ⊗ | PN(t−φ) | |

FIG. 4
PRIOR ART
| CHANNEL NUMBER | ORTHOGONAL SPREAD CODE | ⊗ | PN SERIES — SPREAD CODE |
|---|---|---|---|
| #1 | W1(t) | ⊗ | PN(t) |
| #2 | W2(t) | ⊗ | PN(t) |
| ⋮ | | ⋮ | |
| #m | Wm(t) | ⊗ | PN(t) |
FIG. 5
PRIOR ART
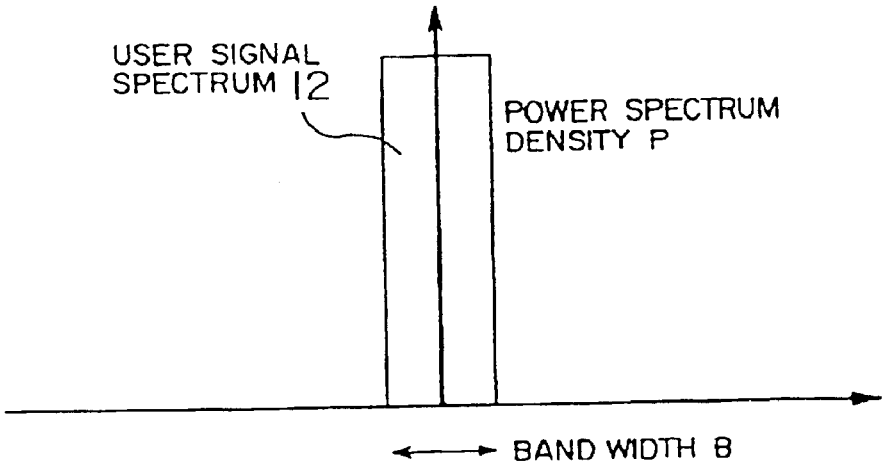
FIG. 6
PRIOR ART
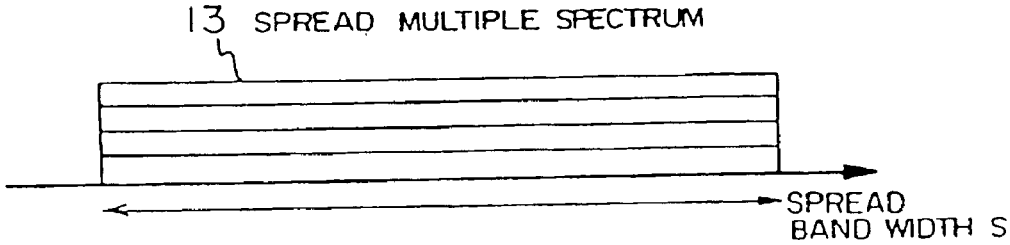

AUTOMOBILE ON-BOARD AND/OR PORTABLE TELEPHONE SYSTEM

Matter enclosed in heavy brackets [ ] appears in the original patent but forms no part of this reissue specification; matter printed in italics indicates the additions made by reissue.

*CROSS-REFERENCE TO RELATED APPLICATION*

*This is a continuation of application Ser. No. 09/337,403, now patented as RE37,420, which was filed on Jun. 21, 1999, to seek reissue of U.S. Pat. No. 5,677,292. That patent issued on Oct. 14, 1997 on application Ser. No. 08/272,156, filed on Jul. 8, 1994.*

BACKGROUND OF THE INVENTION

1. Field of the Invention

The present invention relates to an automobile on-board and/or portable telephone system in which the number of channels can be increased easily.

2. Description of the Related Art

In recent years, automobile on-board and/or portable telephone systems of *the* code division multiple access (CDMA) type have been developed for practical use as described in a paper "On the System Design Aspects of Code Division Multiple Access (CDMA) Applied to Digital Cellular and Personal Communications Networks", May 19–22, 1991, IEEE Vehicular Technology Conference. A conventional example of the construction of the automobile on-board and/or portable telephone system *the* of CDMA is shown in FIG. 3. In the Figure, reference numeral 1 designates units at the transmitter side such as a base station and 2 units at the receiver side such as an automobile on-board telephone or a portable telephone. Denoted by reference numerals 3, 4 and 5 are information input lines which are provided, in the units at the transmitter side 1, in correspondence to channel numbers assigned to individual users and to which information from the individual users is inputted, the information input lines 3, 4 and 5 corresponding to channel numbers #1, #2 and #3, respectively. Reference numerals 6, 7 and 8 designate spread modulators connected to the information input lines 3, 4 and 5, respectively, and operative to perform spread processings in accordance with spread [code] *codes* corresponding to the individual channel numbers, and reference numeral 9 designates a combiner for synthesis and transmission of spread signals of a plurality of users. Denoted by reference numeral 10 is [an] *a* despreader adapted to perform, in the units at the receiver side 2, a despread processing in accordance with a spread code of a channel assigned to each user. In the units at the transmitter side 1, the spread modulators 6, 7 and 8 are supplied with parameters W1(t), W2(t) and Wm(t) representative of orthogonal spread codes, respectively, and a parameter PN(t) representative of a pseudo-random noise series, and the orthogonal spread codes are multiplied by the pseudo-random noise series to produce spread codes corresponding to the individual channels and spread processings are carried out in accordance with the spread codes. In the following description, the pseudo-random noise series is referred to as *the* "PN" series. In the units at the receiver side 2, each equipment has [an] *a* despreader 10 and when the channel number of the units at the receiver side 2 shown in FIG. 3 is #i, that despreader 10 is supplied with a parameter Wi(t) representative of an orthogonal spread code and the parameter PN(t) representative of the PN series to perform a despread processing in accordance with a spread code corresponding to that channel. To perform the spread and despread processings as above, spread codes as exemplified in FIG. 4 are used inside a certain cell in correspondence to channel numbers assigned to individual users.

In the automobile on-board and/or portable telephone system constructed as above, when user information is inputted from each information input line 3, 4 or 5 at a predetermined information transmission bit rate, for example, B(bps), a spread processing is carried out, in the units at the transmitter side 1, by the spread modulator 6, 7 or 8 in accordance with a spread code corresponding to a channel number assigned to a user of interest and then spread signals of a plurality of users are combined in the combiner 9 and transmitted. On the other hand, when a combined spread signal is received in the units at the receiver side 2, the combined spread signal is subjected to a despread processing by the despreader 10 in accordance with a spread code of a channel number assigned to each user to reproduce the information at the information transmission bit rate B(bps) and the reproduced information is delivered out through an information output line 11.

Waveforms are changed as shown in FIGS. 5 to 7 when a signal representative of user information received at a certain information transmission bit rate is subjected to a spread processing, transmitted and then subjected to despread. The user information inputted from the information input line 3, 4 or 5 has the form of a spectrum signal 12 having a bandwidth of B and a power spectrum density of P. When this spectrum signal 12 undergoes a spread processing in the spread modulator 6, 7 or 8, power in the bandwidth B is spread to a spread bandwidth S of a spread multiplexed spectrum on a link path as shown in FIG. 6 to provide a spread signal 13 shown therein. Since the spread modulators 6, 7 and 8 correspond to channel numbers assigned to the individual users and the spread codes are set to different values in correspondence to the respective channel numbers as shown in FIG. 4, the spread signal 13 differs from channel to channel to assume a multiplexed structure. FIG. 6 shows an example of *a* 4-channel spread multiplexed spectrum.

When the spread signal 13 as above is subjected to a despread processing in the units at the receiver side 2, the despread processing is carried out in the units at the receiver side 2 under the condition that the orthogonal spread code is Wi(t) and the PN series is PN(t) and consequently, of the 4-channel spread multiple spectrum, a spread signal of a channel corresponding to this spread code, that is, the power of a desired wave, is again concentrated in the bandwidth B and multiplexed signals of the other users (for three channels) remain spread waveforms which exist as interference waves. Then when the multiplexed spectrum is filtered to pass the band B in the units at the receiver side 2, there [result] *results* a desired wave 14 subject to the despread and a spectrum of interference wave 15. As long as the ratio between power of the desired wave 14 and power of the interference wave 15, that is, the signal to interference ratio (SIR) can be maintained at a predetermined value, *the* necessary quality of communication can be maintained.

Also, when B=9600, that is, the information transmission bit rate is 9600 bps, a maximum of 64 channels can be set within a range in which the SIR can be maintained at a predetermined value from the viewpoint of coping with the interference and there is available an example of an automobile on-board and/or portable telephone system using 64 kinds of Walsh codes representative of orthogonal spread [code] *codes*.

In the aforementioned conventional automobile on-board and/or portable telephone system, however, the maximum

[channel] *number of channels* of the outbound link path (a link path [bound] from the base station to an automobile on-board telephone or a portable telephone) in one cell is limited to the number of orthogonal spread codes ([assuming] *assumed to be* m) and, for example, even [when a] *if* voice signal [coded] *coding* (coding/decoding unit) having a rate which is half the presently existing rate becomes applicable in the future in the field of communication, there will be a disadvantage *in* that the *subscriber* capacity [of subscribers] cannot be increased because of a shortage of [the number of assigned] codes or series in spite of the fact that link paths in excess of m channels [are] *could be* set up in one cell from the viewpoint of the necessary SIR and the requisite quality [can] *could* be maintained for performing communication.

More specifically, in the case where the information transmission bit rate is, for example, halved, the bandwidth becomes B/2 in a signal spectrum 16 of user information as shown in FIG. 8 and when this spectrum signal 16 having a power spectrum density of Po is subjected to a spread processing by the spread modulator 6, 7 or 8, power inside the bandwidth B/2 is spread to a spread bandwidth S of *a* spread multiplexed spectrum on *a* link path of FIG. 9 and there results a spread signal as shown in FIG. 9. Since as described previously the spread modulators 6, 7 and 8 are set with [values of] spread code *values* which are different for *different* channel numbers, the spread signal 17 differs for the individual channels and has a multiplexed structure. FIG. 9 shows an example of a 7-channel spread multiplexed spectrum.

When the spread signal 17 is subjected to a despread processing in the units at the receiver side 2, the despreader 10 performs the despread processing in accordance with Wi(t) representative of the orthogonal spread code and the PN(t) representative of the PN series and consequently, of the 7-channel spread multiplexed spectrum, a spread signal corresponding to this spread code, that is, *the* power of a desired wave 18, is again concentrated to the bandwidth B/2 and the multiplexed signals of the other users (for 6 channels) remain spread waveforms which exist as interference waves 19. Then when the multiplexed spectrum is filtered to pass the band B in the units at the receiver side 2, there [result] *results* a desired wave 18 subject to the despread and a spectrum of interference waves 19 as shown in FIG. 10. As long as the ratio between power of the desired wave 18 and power of the interference waves 19, that is, the signal to interference ratio (SIR), can be maintained at a predetermined value, the necessary quality of communication can be maintained. In this case of half rate, since the SIR can be maintained at a predetermined value, the number of the interference waves 19 for maintaining the necessary communication quality can be increased to a value which is twice the presently existing rate. For simplicity of explanation, the number of multiplexed channels is small in the example (presently existing) of FIGS. 5 to 7 and the example (in the future) of FIGS. 8 to 10 but actually the number of multiplexed channels is large (presently, 64 channels) and the number of multiplexed channels can be increased approximately twice (in this case, amounting up to 128 channels). Accordingly, if the capacity of subscribers is not increased but is left to be *the* existing one, then the automobile on-board and/or portable telephone system will be used wastefully.

SUMMARY OF THE INVENTION

The present invention is achieved in the light of the above problems and it is an object of the present invention to provide an automobile on-board and/or portable telephone system which can increase the capacity of subscribers easily on the basis of, for example, changing of the information transmission bit rate.

According to the present invention, to accomplish the above object, spread codes resulting from multiplication of m orthogonal spread codes and a first PN series are assigned to channel numbers #1 to #m in the same cell, and spread codes resulting from multiplication of the same m orthogonal spread codes as above and a second PN series, which is of the same series as the first PN series but has a time phase differing from that of the first PN series by a constant phase, are assigned to channel numbers #(m+1) to #2m.

In the present invention having the above construction, the PN series are subjected to multiplication while keeping the series unchanged but changing only the time phase to generate spread codes and the thus generated spread codes are assigned to the channels, thereby ensuring that the number of channels in the same cell can be twice the number of the orthogonal spread codes. Accordingly, for example, [when a] *if* voice signal [coded] *coding* having a rate which is half the existing rate becomes applicable in the future, series which are as large in number as necessary can be assigned to increase the capacity of subscribers within a range in which the necessary quality can be maintained even when link paths in excess of m channels are set up in one cell from the viewpoint of the requisite SIR.

BRIEF DESCRIPTION OF THE DRAWINGS

FIG. 4 is a diagram showing an example of the channel structure in the conventional example;

FIG. 5 is a diagram showing a spectrum signal of user information transmitted at the existing information transmission bit rate;

FIG. 6 is a diagram showing a spread multiplexed spectrum signal obtained by subjecting the spectrum signal to spread processings;

DESCRIPTION OF THE PREFERRED EMBODIMENTS

The present invention will now be described by way of example with reference to the accompanying drawings. FIG.

Figures 2, 3:
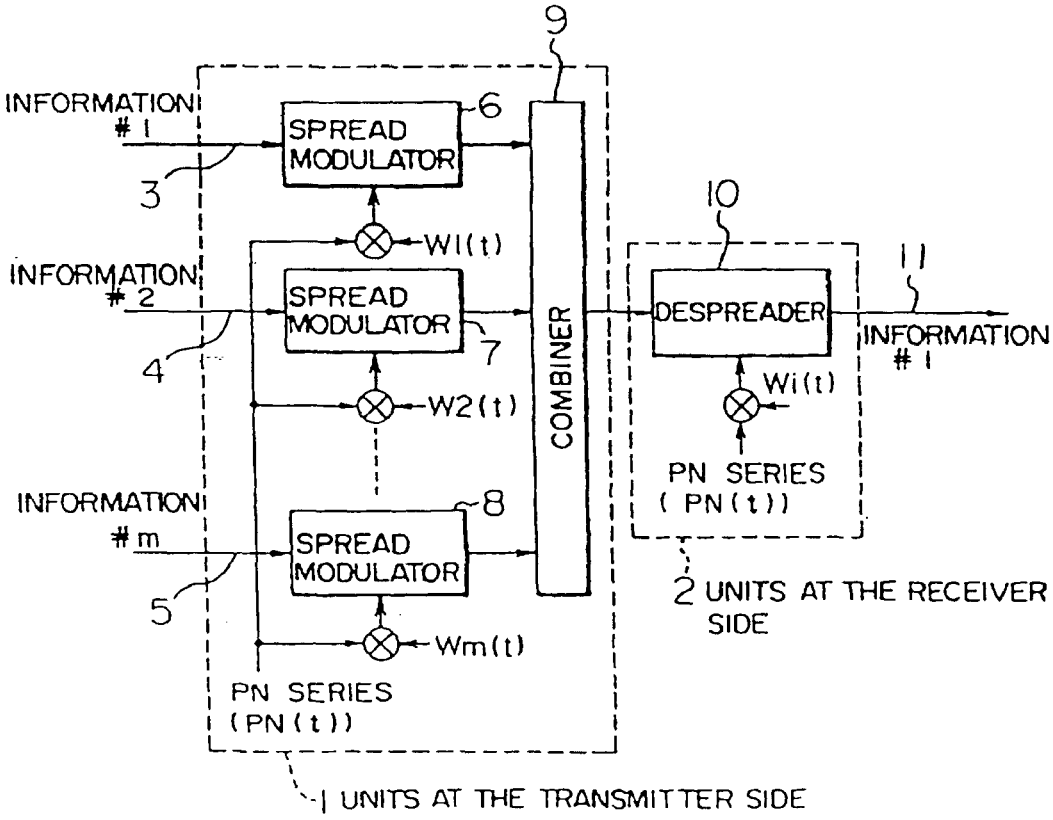
FIG. 3 PRIOR ART
FIG. 2 is a diagram showing an example of the channel structure adopted in the embodiment.
FIG. 3 is a block diagram showing the construction of a conventional automobile on-board and/or portable telephone system.
Figure 7:
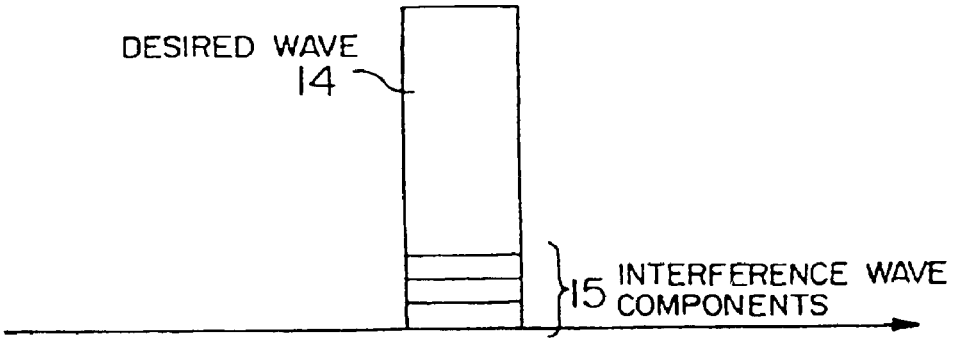
FIG. 7 PRIOR ART
FIG. 7 is a diagram showing a desired wave and a spectrum of interference waves obtained by subjecting the spread multiplexed spectrum signal to a despread processing.

1 is a block diagram showing the construction of an automobile on-board and/or portable telephone system according to an embodiment of the present invention and FIG. 2 is a diagram showing a channel structure in the embodiment. In the Figure, reference numeral 21 designates units at the transmitter side such as a base station and 22 designates units at the receiver side such a mobile station including an automobile on board telephone or a portable telephone. Denoted by reference numerals 23, 24, 25, 26, 27 and 28 are information input lines which are provided, in the units at the transmitter side 21, in correspondence to channel numbers assigned to individual users and to which information from the individual users is inputted, by 29, 30, 31, 32, 33 and 34 are spread modulators connected to the information input lines 23 to 28, respectively, and operative to perform spread processings in accordance with spread codes corresponding to the individual channel numbers, and by 35 a combiner for combining and transmitting spread signals of users corresponding to channel numbers #1 to #2m. Of the information input lines 23 to 28 and spread modulators 29 to 34, the information input lines 23 to 25 and spread modulators 29 to 31 are in association with the channel numbers #1 to #m to constitute a first channel group of m [series] *channels* and information input lines 26 to 28 and spread modulators 32 to 34 are in association with the channel numbers #(m+1) to #2m to constitute a second channel group of m [series] *channels*. Denoted by reference numeral 36 is a despreader adapted to perform, in the units at the receiver side 22, a despread processing in accordance with a spread code of a channel assigned to each user.

In the units at the transmitter side 21, the spread modulators 29, 30 and 31 of the first channel group are set so as to perform spread processings in accordance with the spread [code] *codes* corresponding to the individual channels by being supplied with parameters W1(t), W2(t) and Wm(t) representative of orthogonal spread codes (m is [a] *the* number of the codes), respectively, and a parameter PN(t) representative of a PN series. The spread modulators 32, 33 and 34 of the second channel group are set so as to perform spread processings in accordance with the spread codes corresponding to the individual channels by being supplied with the same parameters W1(t), W2(t) and Wm(t) representative of orthogonal spread codes as those for the spread modulators 29, 30 and 31 of the first channel group and a parameter PN(t−ϕ) representative of the PN series. The parameter PN(t−ϕ) representative of the PN series is of the same PN series as that represented by PN(t) but has a time phase which differs from that of PN(t) by a constant phase. Through this, in the automobile on-board and/or portable telephone system of the present embodiment, a maximum of [m] *2m* channels can be set on the outbound link path of one cell.

Figure 1:
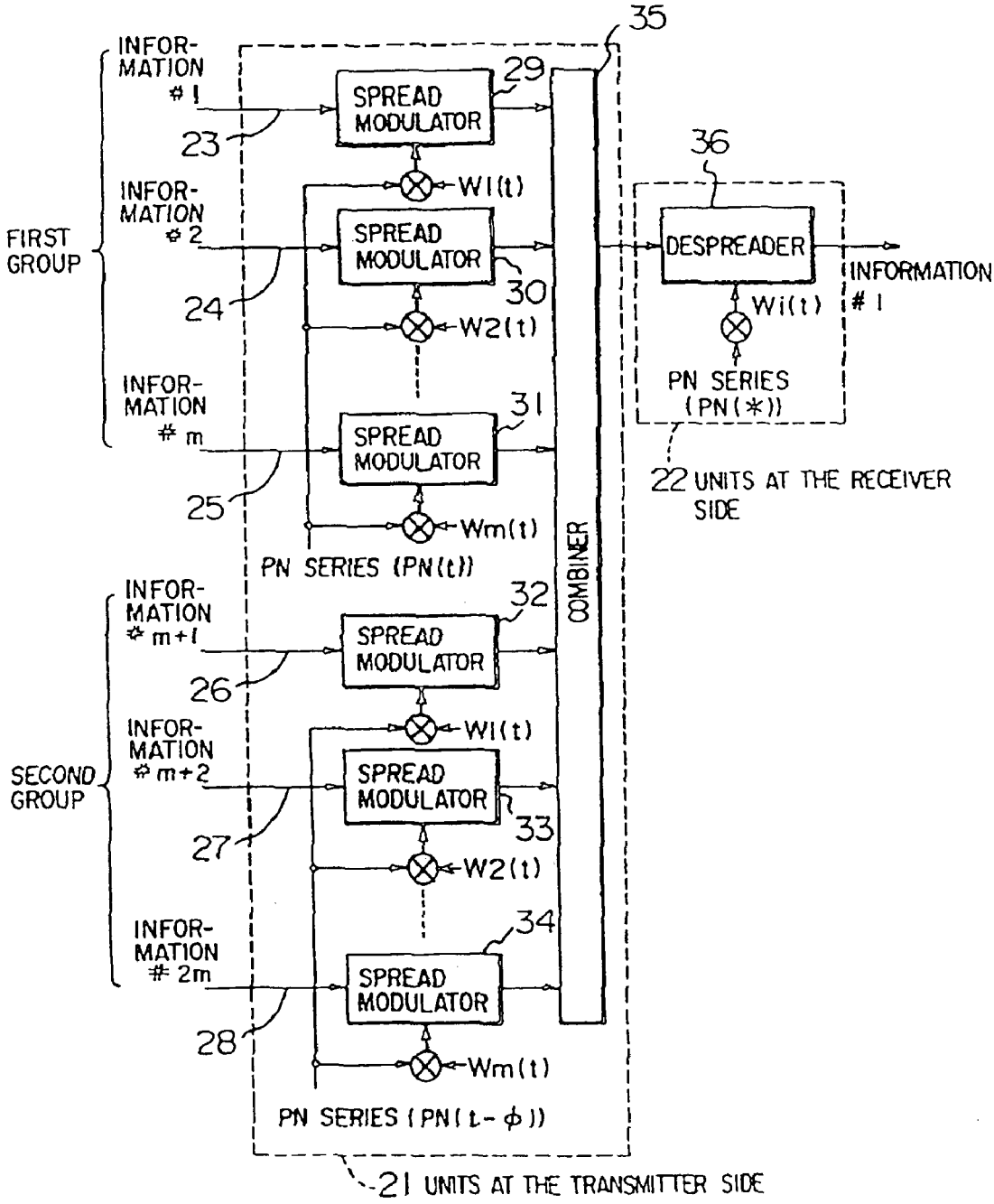
FIG. 1 is a block diagram showing the construction of an embodiment of an automobile on-board and/or portable telephone system according to the present invention.

In the units at the receiver side 22, each equipment has [an] *a* despreader 36 and when the channel number of the units at the receiver side 22 shown in FIG. 1 is #1, that despreader 36 is supplied with a parameter Wi(t) representative of an orthogonal spread code and a parameter PN(*) representative of the PN series, where PN(*) is PN(*)=PN(t) when i≦m, and PN(*)=PN(t−ϕ) when i≧m+1.

Then the orthogonal spread codes are multiplied by the PN series to produce spread codes and by performing a despread processing in accordance with a spread code corresponding to a channel of interest, a user signal destined for this apparatus can be reproduced. A channel structure for performing the above spread and despread processings is shown in FIG. 2.

Figure 8:
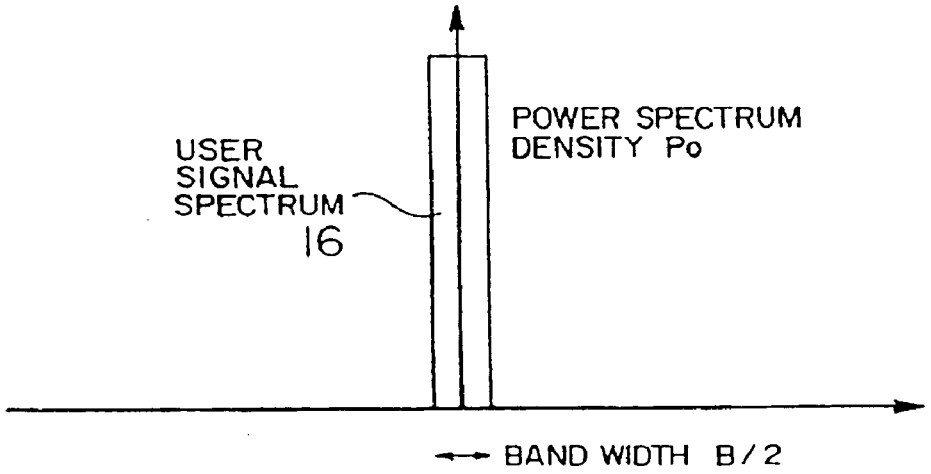
FIG. 8 is a diagram showing a spectrum signal of user information transmitted at a bit rate which is half the existing information transmission bit rate.
Figure 9:
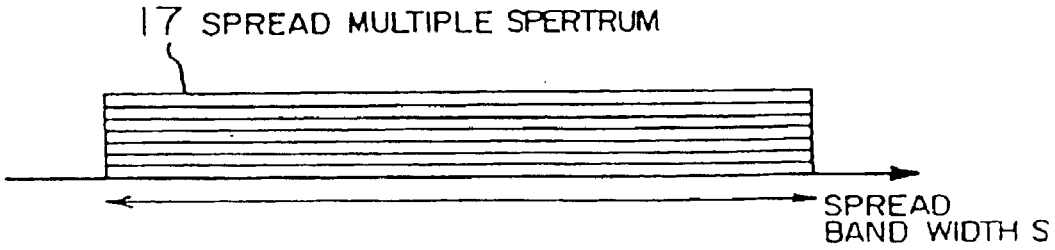
FIG. 9 is a diagram showing a spread multiplexed spectrum signal obtained by subjecting the spectrum signal transmitted at the half rate to spread processings.
Figure 10:
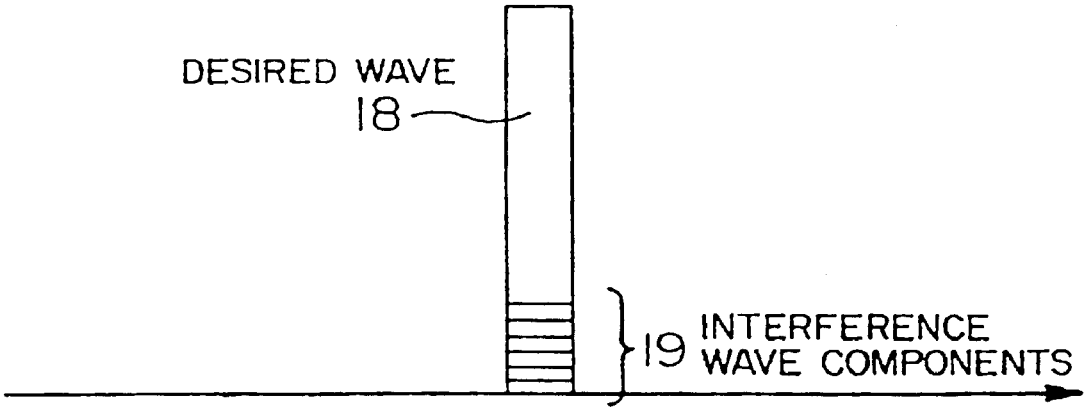
FIG. 10 is a diagram showing a desired wave and a spectrum of interference waves obtained by subjecting the spread multiplexed spectrum signal shown in FIG. 9 to a despread processing.

The operation of the automobile on-board and/or portable telephone system will now be described. In the units at the transmitter side 21, when user information is inputted from one of the information input lines 23 to 28 at a predetermined transmission bit rate, for example, B/2 (bps) which is the half of the rate B, a spread processing is carried out by one of the spread modulators 29 to 34 in accordance with a spread code corresponding to a channel number assigned to the user of interest and then spread signals of a plurality of users are combined in the combiner 35 and transmitted. On the other hand, when a combined spread signal is received in the units at the receiver side, the combined spread signal is subjected to a despread processing by the despreader 36 in accordance with a spread code of the channel number assigned to that user to reproduce the information at the information transmission bit rate B (bps) and the reproduced information is delivered out through an information output line. When the signal indicative of the user information transmitted at the halved information transmission bit rate is subjected to the spread processing, transmitted and subjected to the despread *processing*, its waveform is changed. The operational condition of the waveform change has already been described with reference to FIGS. 8 to 10 and will not be described herein.

Accordingly, for example, when a voice signal coded having a rate which is half the presently existing rate becomes applicable in the future, [channels of] a maximum of 2 m *channels* can be set simultaneously if the requisite communication quality can be maintained in spite of the fact that link paths in excess of m channels are set up in one cell from the viewpoint of the necessary SIR, thereby making it possible to increase the capacity of subscribers without drastically improving component units manufactured in correspondence to the existing automobile on-board and/or portable telephone system or exchanging all of the component [unit] *units* with new ones. In order to maintain the communication quality from the viewpoint of the necessary SIR, [a] *the* maximum [value of the] number of link paths allowed to be set up simultaneously in the cell can be decided on the basis of information transmission bit rates for individual users [set on] *of* link paths set up in the units at the transmitter side 21 or the base station and *the* setting of link paths for the users can be allowed within the maximum value.

In the foregoing embodiment, the PN series by which the orthogonal spreads are multiplied is exemplified to have two different phases, however, the number of phases can be determined [desirably] *as desired*. For example, in the case where service at a very low information transmission bit rate is given as a system and the user often receives the service, the requisite quality can be maintained from the viewpoint of the necessary SIR even when link paths are set up for very many users in one cell. In such a system, three or more types of phases of the PN series by which the orthogonal spread code are multiplied can be employed instead of two types and hence the number of spread codes to be assigned can be increased to a great extent to further increase the subscriber's capacity.

As described above, according to the present invention, different phases of the PN series by which the orthogonal spread codes are multiplied are given to provide some types of PN series so that the number of channels in the same cell may be maintained at a value which is a multiple of the number of series and therefore in the case where a voice signal coded is applied at a rate which is half the presently existing rate in the future, assignment of spread codes which are increased in number to as large a value as necessary can be achieved and the subscriber's capacity can be increased without drastically altering the components within a range in which the necessary quality can be maintained even when link paths for m or more channels are set up in one cell from the viewpoint of SIR.

We claim:

[1. A mobile telephone system comprising:

a transmitting side apparatus serving as a base station and including spread modulation means for spreading information data from a plurality of users by using a plurality of spread codes corresponding to channel numbers assigned to said plurality of users respectively and combining means for combining the spread information data and transmitting the combined information data; and a receiving side apparatus including despread means for despreading the transmitted information data by using said plurality of spread codes corresponding to the channel numbers assigned to said plurality of users respectively;

wherein said plurality of spread codes are obtained by multiplying m orthogonal spread codes by pseudo-random noise codes and assigned to individual channels in the same cell in such a manner that the spread codes, which are obtained by multiplying said m orthogonal spread codes by a first pseudo-random noise code, are assigned to channel numbers #1 to #m and that the spread codes, which are obtained by multiplying said m orthogonal spread codes by a second pseudo-random noise code having the same code as the first pseudo-random noise code but having a different time phase from that of the first pseudo-random noise code by a predetermined time period, are assigned to channel numbers #(m+1) to #2m, thereby making a number of channels in the same cell larger than number of the orthogonal spread codes.]

[2. A mobile telephone system according to claim 1, wherein said m orthogonal spread codes are multiplied by n pseudo-random noise codes having different time phases from each other to obtain n×m spread codes where n is an integer larger than 2, thereby making the number of channels in the same cell to be n times as large as the number of the orthogonal spread codes.]

[3. A CDMA (code division multiple access) transmitter, comprising:

first means for multiplying a plurality of orthogonal codes by a first pseudo-random noise code to obtain a plurality of first spreading codes and for employing the first spreading codes to spread information associated with a first plurality of channels to which the first spreading codes are assigned respectively;

second means for multiplying the orthogonal codes by a second pseudo-random noise code to obtain a plurality of second spreading codes and for employing the second spreading codes to spread further information associated with a second plurality of channels to which the second spreading codes are assigned respectively, the second pseudo-random noise code being substantially the same as the first pseudo-random noise code except for a phase difference; and means for combining at least the information spread by the first and second means to obtain combined information for transmission.]

[4. A CDMA (code division multiple access) transmission method, comprising the steps of:

(a) multiplying a plurality of orthogonal codes by a first pseudo-random noise code to obtain a plurality of first spreading codes;

(b) employing the first spreading codes to spread information associated with a first plurality of channels to which the first spreading codes are assigned respectively;

(c) multiplying the orthogonal codes by a second pseudo-random noise code, when further channels are needed by further information, to obtain a plurality of second spreading codes, the second pseudo-random noise code being substantially the same as the first pseudo-random noise code except for a phase difference;

(d) employing the second spreading codes to spread the further information associated with a second plurality of channels to which the second spreading codes are assigned respectively; and (e) combining at least the information that was spread during steps (b) and (d) to obtain combined information for transmission.]

[5. A CDMA (code division multiple access) communication system, comprising:

a transmitter which includes:

first means for multiplying a plurality of orthogonal codes by a first pseudo-random noise code to obtain a plurality of first spreading codes and for employing the first spreading codes to spread information associated with a first plurality of channels to which the first spreading codes are assigned respectively, second means for multiplying the orthogonal codes by a second pseudo-random noise code to obtain a plurality of second spreading codes and for employing the second spreading codes to spread further information associated with a second plurality of channels to which the second spreading codes are assigned respectively, the second pseudo-random noise code being substantially the same as the first pseudo-random noise code except for a phase difference, and means for combining at least the information spread by the first and second means to obtain combined information for transmission; and a receiver which includes means for recovering the information associated with at least one of the first and second plurality of channels by despreading the combined information with at least one of the first and second spreading codes.]

[6. A method for us in a CDMA (code division multiple access) communication system for recovering information that was transmitted over a first channel or a second channel, said method comprising the steps of:

(a) multiplying a code selected from a set of orthogonal codes by another code to obtain a spreading code;

(b) despreading a received signal using the spreading code obtained in step (a); and (c) selecting the first channel or the second channel by using, as the another code in step (a), a predetermined pseudo-random noise code or the pseudo-random noise code shifted in phase.]

[7. A CDMA (code division multiple access) receiver for recovering information that was transmitted over a first channel or a second channel, said receiver comprising:

despreading means for despreading a received signal to recover the information that was transmitted over the first channel or the second channel; and multiplying means for multiplying a code selected from a set of orthogonal codes by a pseudo-random noise code or the pseudo-random noise code shifted in phase, the information transmitted over the first channel being recovered if the selected orthogonal code is multiplied by the pseudo-random noise code and the information transmitted over the second channel being recovered if the selected orthogonal code is multiplied by the pseudo-random noise code shifted in phase.]

*8. A CDMA (code division multiple access) communication system, comprising:*

*first transmitter means for multiplying a plurality of orthogonal codes by a first pseudo-random noise code to obtain a plurality of first spreading codes and for employing the first spreading codes to spread information;*

*second transmitter means for multiplying the orthogonal codes by a second pseudo-random noise code to obtain a plurality of second spreading codes and for employing the second spreading codes to spread information, the second pseudo-random noise code being substantially the same as the first pseudo-random noise code except for a phase difference;*

*first receiver means which includes means for recovering the information by despreading the information with one of the first spreading codes; and*

*second receiver means which includes means for recovering information by despreading the information with one of the second spreading codes.*

*9. A CDMA (code division multiple access) communication method, comprising the steps of:*

*(a) multiplying a plurality of orthogonal codes by a first pseudo-random noise code to obtain a plurality of first spreading codes;*

*(b) employing the first spreading codes to spread information prior to transmission thereof;*

*(c) multiplying the orthogonal codes by a second pseudo-random noise code to obtain a plurality of second spreading codes;*

*(d) employing the second spreading codes to spread information prior to transmission thereof;*

*(e) recovering received information by despreading it with one of the first spreading codes; and*

*(f) recovering received information by despreading it with one of the second spreading codes.*

*10. A method for use in a CDMA (code division multiple access) communication system for transmitting information, said method comprising the steps of:*

*(a) multiplying a code selected from a set of orthogonal codes by another code to obtain a spreading code; and*

*(b) using, as the another code in step (a), a predetermined pseudo-random noise code or the pseudo-random noise code shifted in phase.*

*11. A CDMA (code division multiple access) transmitter for transmitting information, said transmitter comprising:*

*(a) spreading means for spreading the information; and*

*(b) multiplying means for multiplying a code selected from a set of orthogonal codes by a pseudo-random noise code or the pseudo-random noise code shifted in phase.*

* * * * *